(12) United States Patent
Sen et al.

(10) Patent No.: US 10,590,763 B2
(45) Date of Patent: Mar. 17, 2020

(54) PROPPANT ADDITIVES FOR HYDRAULIC FRACTURING

(71) Applicants: THE UNIVERSITY OF NORTH CAROLINA AT CHAPEL HILL, Chapel Hill, NC (US); BOARD OF REGENTS, THE UNIVERSITY OF TEXAS SYSTEM, Austin, TX (US); STATOIL GULF SERVICES LLC, Houston, TX (US)

(72) Inventors: Pabitra N. Sen, Berkeley, CA (US); Alfred Kleinhammes, Chapel Hill, NC (US); Yue Wu, Chapel Hill, NC (US); Michele O'Callaghan, Houston, TX (US); Mohsen Ahmadian-Tehrani, Austin, TX (US)

(73) Assignees: THE UNIVERSITY OF NORTH CAROLINA AT CHAPEL HILL, Chapel Hill, NC (US); BOARD OF REGENTS, THE UNIVERSITY OF TEXAS SYSTEM, Austin, TX (US); STATOIL GULF SERVICES LLC, Houston, TX (US)

(*) Notice: Subject to any disclaimer, the term of this patent is extended or adjusted under 35 U.S.C. 154(b) by 93 days.

(21) Appl. No.: 15/837,703

(22) Filed: Dec. 11, 2017

(65) Prior Publication Data

US 2018/0100389 A1    Apr. 12, 2018

Related U.S. Application Data

(63) Continuation-in-part of application No. PCT/US2016/037214, filed on Jun. 13, 2016.
(Continued)

(51) Int. Cl.
*E21B 49/00* (2006.01)
*E21B 43/267* (2006.01)
(Continued)

(52) U.S. Cl.
CPC ............... *E21B 49/00* (2013.01); *C09K 8/80* (2013.01); *E21B 43/267* (2013.01); *G01V 3/26* (2013.01)

(58) Field of Classification Search
CPC ......... E21B 49/00; E21B 43/267; C09K 8/80; G01V 3/26
See application file for complete search history.

(56) References Cited

U.S. PATENT DOCUMENTS

2011/0309835 A1    12/2011    Barber et al.
2012/0169343 A1    7/2012    Eick et al.
(Continued)

FOREIGN PATENT DOCUMENTS

RU    2374438 C2    11/2009
WO    2010011402 A2    1/2010
WO    2013181527 A1    12/2013

OTHER PUBLICATIONS

Federal Institute of Industrial Property; International Search Report & Written Opinion for PCT/US2016/037214; dated Oct. 20, 2016; 6 pages; Moscow; RU.
(Continued)

*Primary Examiner* — Brad Harcourt
(74) *Attorney, Agent, or Firm* — Matheson Keys & Kordzik PLLC; Kelly Kordzik

(57) ABSTRACT

Hydraulic fracturing of a geological formation is performed by injection of a proppant mixture into the geological formation to form fractures in the geological formation. The proppant mixture includes at least a liquid, proppant, and proppant additive particles. The hydraulic fracturing results
(Continued)

in a presence of the proppant additive particles within the formed fractures, wherein the proppant additive particles are configured with a first complex conductivity that is measurably different than a second complex conductivity exhibited by materials comprising the geological formation. The formed fractures can then be imaged and mapped in the geological formation with electromagnetic energy at one or more frequencies in a manner so that the proppant additive particles function as a contrast agent due to the first complex conductivity of the proppant additive particles being measurably different from the second complex conductivity. The complex conductivity includes a real conductivity and an imaginary conductivity.

17 Claims, 7 Drawing Sheets

Related U.S. Application Data

(60) Provisional application No. 62/174,079, filed on Jun. 11, 2015.

(51) Int. Cl.
*C09K 8/80* (2006.01)
*G01V 3/26* (2006.01)

(56) References Cited

U.S. PATENT DOCUMENTS

| 2014/0190686 A1* | 7/2014 | Cannan ............... E21B 43/25 166/250.01 |
| 2015/0068747 A1 | 3/2015 | Hwang et al. |
| 2015/0167459 A1 | 6/2015 | Sen et al. |

OTHER PUBLICATIONS

Brown et al; Imaging: Getting the Picture Downhole; Oilfield Review; 18 pages; Sep. 2015; Schlumberger Limited.

Groundmetrics; Evaluation of Deep Subsurface Resistivity Imaging for Hydrofracture Monitoring; Project No. DE-FE0013902; Third Quarterly Progress Report; Jul. 30, 2014; 28 pages; GroundMetrics, Inc; San Diego, CA.

Pardo, et al; Sensitivity Analysis for the Appraisal of Hydrofractures in Horizontal Wells of Borehold Resistivity Measurements; Geophysics; vol. 78, No. 4; Jul.-Aug. 2013; 14 pages; Society of Exploration Geophysicists.

International Bureau of WIPO, International Preliminary Report on Patentability, International Application No. PCT/US2016/037214, dated Dec. 21, 2017.

* cited by examiner

PROPPANT ADDITIVES FOR HYDRAULIC FRACTURING

TECHNICAL FIELD

This application is a Continuation-In-Part of International Application Serial No. PCT/US2016/037214, which claims priority to U.S. Provisional Application Ser. No. 62/174,079, both of which are incorporated herein by reference. The present invention relates in general to hydraulic fracturing, and in particular to mapping of fractures in a geological formation.

BACKGROUND AND SUMMARY

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Hydraulic fracturing (sometimes referred to herein as "hydrofracturing," hydrofracking," or "fracking") is a technique in which a mixture of a liquid (e.g., water with a chemical additive that provides appropriate viscoelastic properties) mixed with proppants (generally, small grains of sand or aluminum oxide with diameters between 0.1 millimeters ("mm") to 0.3 mm) is injected through a well borehole at high pressure into a geological formation (e.g., an oil/gas reservoir). This creates fractures in the deep rock formation, typically less than 5 mm wide, 10 meters ("m")-100 m long, and 10 m-100 m high, along which oil and/or gas, as well as water, migrate to a producing well. When the hydraulic pressure is removed from the formation, then the small grains in the proppant hold these fractures open. Both the locations of fractures that are created and the dimensions of the created openings, which are important for determining the hydraulic conductivity of the fractures and the efficacy of the fracture, are difficult to determine. Thus, mapping of the fractures that remain open upon the removal of the fracking pressure is important since neither the location, orientation, size of the openings, nor the drainage area of the fracture is well known.

However, mapping fractures in geological formations is a difficult problem because of the extreme spatial anisotropy of a fracture, which may feature a width of barely a millimeter and extend in height and length over an area covering approximately 30 m by 100 m. Creating a fracture often appears as a random process, since the underlying over burden pressure, rock type, and anisotropy are not known. Neither the shape nor extent of the created fracture can be predicted. Therefore, the amount of oil and/or gas that it may produce is uncertain as well. Imaging the fractures is of critical importance to the industry, and currently no methods exist that provide satisfactory detailed information about the geometrical and spatial features of the fractures.

The current fracturing practice is a highly developed technology with a strongly ingrained infrastructure and is an expensive operation often involving millions of gallons of fluids and a very large amount of proppants (e.g., approximately 300,000 pounds (136 metric tons)) per job. Typically, 90% of the injected proppant mixture is water, 9.5% is proppant (e.g., sand or ceramic particles), and about 0.5% may include a chemical additive. The pumps and accessories are designed to pump the proppant mixture in massive amounts. If the oil and gas industry is to accept contrast agents or alternative proppant additive materials, then these will need to be producible at low cost (at least substantially equivalent to current sand or ceramic proppant costs).

In addition, such proppant additives should adhere to the following:

1. The proppant additive should have similar flow and dispersion properties as conventional proppants with which they are injected into the fracture system. Therefore, the density of the proppant additive should be similar to that of conventional proppants.

2. The proppant additive should be sufficiently strong to withstand the dynamic pressure that is exerted when the fracture tries to close after the pump pressure is relieved.

3. The proppant additive should have a high contrast—either dielectric or conductive or both.

Currently, limited techniques exist for detecting fractures. A passive technique sometimes used to geo-locate the fractures, referred to as "Microseismic," relies on the bursting sound (acoustic noise) the fractures produce when opening under the hydraulic pressure. However, this technique is not reliable, since some fractures are likely to close immediately upon the removal of the external pressure. And, this technique provides no information on the sizes and shapes of the opened fractures that provide the pathways for the drained oil and/or gas. Microseismic also fails to distinguish between the fractures that will remain open after the removal of pressure and those that close. Since many of the initial fractures close and are of no importance to the reservoir drainage area, Microseismic results in images that likely contain numerous irrelevant fracture predictions. In addition, the Microseismic imaging is imprecise in terms of determining the exact locations of the induced fractures, and yields a low resolution image for the fractured rock volume.

Other techniques have used tracers included with the injected fluids, but these techniques do not provide completely reliable data, as the tracers can leak into the formation and do not necessarily remain in the fractures.

Aspects of the present disclosure map fractures with small (e.g., micron to millimeter sized) proppant additives, which are mechanically compatible with oxides and sand particles that are generally used in hydraulic fracturing, by imaging the fractures that remain open after the pump pressure is removed using the proppant additives. The art of hydrofracking is well developed, and pumping involves massive and expensive machines. Therefore, it is important that the disclosed additives can be deployed using the current hydraulic fracturing infrastructure.

Disclosed herein are implementations and specific materials pertaining to the present invention, but aspects of the present disclosure are not limited to these specific ones. Herein, mapping refers to the utilization of some type of contrast agent that has been injected into a geological formation, thus penetrating into the pores and cracks (including hydraulically-induced fractures) of the formation, and then using some sort of imagine techniques (e.g., electromagnetic ("EM") imaging) to determine the locations of the contrast agent within the formation due to its EM-related measurement properties being measurably different than the EM-related measurement properties of the surrounding media (e.g., materials composing the geological formation). In this context, "measurably different" means that there is a way (e.g., by using appropriate equipment) to distinguish between a measurement made of an EM-related measurement property (e.g., complex conductivity) of a contrast agent (e.g., proppant additive particles) located within a media (e.g., a geological formation) and a measurement made of the EM-related measurement property of the surrounding media.

Proppant additives disclosed herein may be configured with special EM-related measurement properties (e.g., complex conductivity), which are sufficiently different (i.e., functions as a contrast agent) from the background (e.g., materials composing the geological formation) so that they become "visible" by EM measurement techniques so that features of the geological formation (e.g., fractures formed by the fracking) can be imaged and mapped. As a result, proppant mixtures disclosed herein are configured so that they result in a significantly increased complex conductivity contrast between the proppant-filled fractures and the surrounding geological formation, and thus an EM technique can detect and map the fractures.

Aspects of the present disclosure measure the complex conductivity, i.e., both the real and the imaginary part. The imaginary part of the conductivity may be referred to herein as "IP" or dielectric, and the real part referred to as conductivity. Generally, it is difficult to obtain a large contrast in conductivity (real part) using granular proppants, as these particles need to physically touch each other in order to provide a "percolating" conductive path (also referred to herein as the "electrical percolation threshold"). That generally requires about 60% of the additive to be conductive. There is no such limitation for the dielectric contribution.

Aspects of the present disclosure may include nanomaterials along with the proppants, which can leak into the unpropped formation (i.e., portions of the geological formation other than the created fractures) and provide further information about the fractured region.

Aspects of the present disclosure utilize induced polarization ("IP") or dielectric enhancement in proppant additives of functionalized silica and/or coke breeze, which are mechanically compatible with currently deployed proppants, such as sand. Being an additive, the volume percentage (v %; also referred to herein as "volume concentration" or "concentration") may be below the aforementioned electrical percolation threshold, and thus will not provide a conductivity (real part of the complex conductivity) contrast. However, aspects of the present disclosure provide an extraordinarily large dielectric contrast, even with a low volume percentage (e.g., <60%) in the proppant fluid. If a large volume concentration fraction is utilized (with the concomitant large conductivity of these contrast materials), it can be used as a conductivity contrast.

Use of the real part of conductivity contrast has been known, and some proposals with specific set-ups (i.e., tool configurations) and specific materials have been proposed. The conductivity (i.e., real part alone) measurements proposed here have some elements in common with, but is not limited to, what has been proposed. Conductivity techniques have previously been proposed to measure the conductivity of a fracture by EM methods (see, Pardo et al., "Sensitivity analysis for the appraisal of hydrofractures in horizontal wells with borehole resistivity measurements," Geophysics, 78, pp. D209-D222, 2013). They are limited to one specific contrast agent and one specific measurement set-up (induction) that is limited to a single well borehole. Aspects of the present disclosure are neither limited by material to be used, nor by the specific induction method in a single well borehole. Aspects of the present disclosure provide a novel sensitivity analysis of through-casing (wellbore) resistivity measurements. For an open hole, Pardo et al. used both magnetic dipole and electric dipoles they claim impress a ring of magnetic current and "electrodes that generate only an Hϕ component of the magnetic field, i.e., Hρ=Hz=0 is the transverse magnetic (TM) mode." However, Pardo et al. do not consider IP effects.

In contrast, aspects of the present disclosure are not restricted to any particular modality, electrode, or coil configuration.

Aspects of the present disclosure utilize crosswell as well as well-to-surface methods using, among other techniques, galvanic methods. Such methods fail in the prior art because at such a high volume of contrast agent, the cost is prohibitive. Pardo et al.'s method fails because it does not measure the complex conductivity or IP/dielectric properties. When particles do not touch (exceeding the electrical percolation threshold), conductivity contrast alone is not enough for mapping using such a technique.

Techniques disclosed by Hoverstein et al. (see Poster WS9-008, 76$^{th}$ EAGE Conference & Exhibition, 2014, "Hydro-frac Monitoring Using Ground Time-domain EMG," M. Hoverstein (Chevron), M. Commer (Lawrence Berkeley National Laboratory), E. Haber (University of British Columbia) and C. Schwarzbach (University of British Columbia)) are limited to the real part of conductivity contrast alone, and study transient decay responses from fracture zones with steel casing as a source. Their materials and the specific borehole methods are also limited.

International Patent Application No. PCT/US2013/043603 disclosed a water-flood mapping technique using nanoparticles. However, nanoparticles are generally too small to keep fractures open, and they may leak into the formation.

Barber et al., in U.S. Published Patent Application No. 2011/0309835A1, proposed to inject conductive fluid and use an IP or a complex conductivity method. However, this technique failed because it did not consider insulating surface active proppants or matching the density of proppant material to that of sand. To be more specific, Barber et al. is limited to specific types of materials (i.e., conducting particles) that produce the IP effects by a specific electrochemical method (oxidation-reduction or Faradaic processes at the interfaces). To provide Faradaic conduction, Barber et al. specifically use the data of Klein and the theory of Wong (see references cited in paragraph [0026] in US 2011/0309835A1; Klein et al., "Mineral interfacial processes in the method of induced polarization," Geophysics, July 1984, Vol. 49, No. 7, pp. 1105-1114; and J. Wong, "An electrochemical model of the induced-polarization phenomenon in disseminated sulfide ores," Geophysics, July 1979, Vol. 44, No. 7, pp. 1245-1265) that limits it to surface processes of a specific type. In general, however, ions such as Na$^+$ and Cl$^-$ are not able to penetrate the lattice structure of the metal, and the metal is not a source for these ions, so the method of Barber et al. is limited to special metals and special environments where a redox reaction can take place, i.e., when the electrolyte contains active ions that can engage in electrochemical charge transfer reactions. The materials (like pyrite) proposed by Barber et al. have high density, and therefore, are not suitable for pumping using the current hydraulic fracturing infrastructure.

Electro-static self or streaming potential techniques, such as proposed in U.S. Published Patent Application No. 2012/0169343, suffer from the drawback of being subjected to the electrode potentials. The electrodes themselves develop static potential that can vary with salinity and pH without the influence of a contrast agent.

Aspects of the present disclosure may employ metallic and/or nonmetallic additives that produce various surface activities (i.e., not limited to oxidation-reduction) for implementing an enhanced dielectric constant. Among other things, aspects of the present disclosure may use clay-like non-conducting materials that derive enhanced dielectric from counter-ions via a completely different mechanism than is involved for metals. Aspects of the present disclosure may use carbonaceous materials, like coke breeze, which are neither metallic nor clay-like, i.e., have little or no zeta potential yet show high dielectric constant. Aspects of the present disclosure may use materials that involve a combination of Faradaic (oxidation-reduction) and non-Faradaic (ideally or partially polarizable) counter-ions and functional groups.

Aspects of the present disclosure may employ induction and/or galvanic methods, using coil electrodes and casing. The geometrical configuration of aspects of the present disclosure is not limited to single borehole configurations as in the above prior art. Aspects of the present disclosure may employ single borehole, cross-hole, surface-to-borehole and borehole-to-surface modalities. For the galvanic methods using IP mode, the proppant additive may have a large dielectric signature at low to medium frequencies (e.g., around 100 Hz).

DETAILED DESCRIPTION

Figure 1:
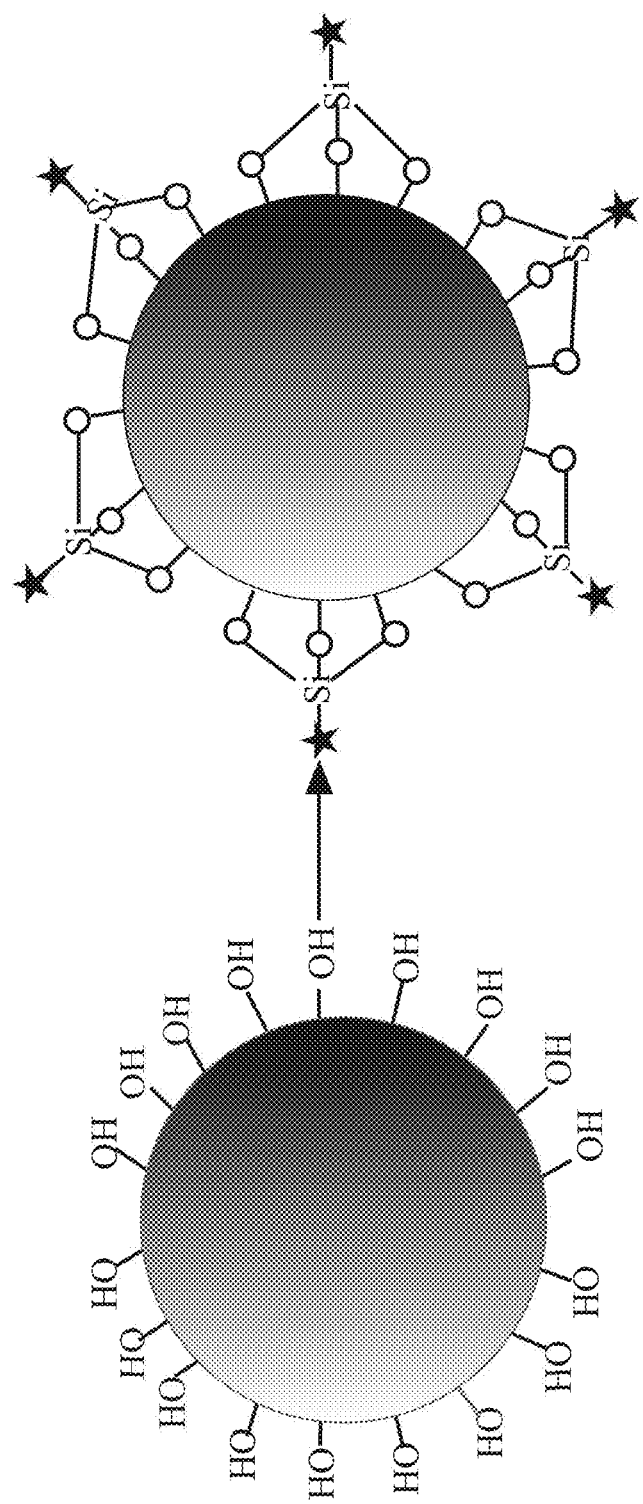
FIG. 1 illustrates conceptual depictions of exemplary functionalizations of silica and sand particles.

Aspects of the present invention relate to optimizing techniques currently in use for retrieving oil and/or gas from subsurface formations, such as those that do not release oil and/or gas easily. Aspects of the present invention provide techniques for evaluating the efficiency of opening and keeping open and predicting hydraulic fracture routes for the extraction of oil and/or gas by measuring various geometrical factors and spatial features of open fractures that include small amounts of proppant additive materials (also referred to as "proppant additives" herein) that have certain measurable properties. Aspects of the present invention provide a proppant additive material that operates as a dielectric permittivity enhancing contrast agent (also simply referred to as a "contrast agent" herein), where size, density, and strength of the material are compatible with common known proppants, such as sand or ceramic particles. The induced polarization ("IP") (dielectric) and conductivity of these proppant additive materials may be used to map the region around the borehole and/or the fractures held open by proppants. Several of the many existing geophysical tools that are used for electromagnetic measurements may be used to detect the signal required for mapping. These include galvanic and induction tools, time domain and frequency domain, multi-well and single well tools. Additional techniques using borehole-to-surface and surface-to-borehole tools may be used. The proppant additive materials may be used alone or in conjunction with commonly known/standard proppant materials (such as sand and ceramics) that are widely used in the industry. Methods disclosed herein yield new proppant materials that are sufficiently inexpensive to be used alone for both conductivity and IP. The geometrical attributes of fractures created in rocks or other subsurface regions, such as, the opening size, length, and/or width of the openings or propped regions allow the operator to evaluate and possibly improve the fracturing techniques being used. Up until now, there was no reliable technique for measuring fracture opening characteristics. Aspects of the present invention disclosed provide mapping of the fracture network during and after the fracturing process.

Aspects of the present invention provide a dynamic in situ location of proppants by mixing novel dielectric proppant additive materials with traditional proppants, such as sand or aluminum oxide, and then measuring complex conductivity parameters (IP, dielectric, and/or conductivity) of the novel proppants. This technique may utilize a complex conductivity contrast with about 1-100% of proppant material that can produce a detectable phase shift, or conductivity contrast, or both. Aspects of the present disclosure demonstrate that the complex conductivity has an advantage of utilizing a lower volume percentage of active materials. Further, the out-of-phase conductivity or IP (or dielectric) provides novel information over and above the real conductivity.

Aspects of the present invention provide examples of materials and descriptions of proppant additive chemistries, compositions, combinations, chemistry, sizes, and shapes that may be suitable for production of a discernible complex conductivity EM signature.

Aspects of the present invention provide for use of dielectric phase angle as a technique for attaining an electromagnetic contrast at low concentrations.

Aspects of the present disclosure involve measuring and mapping (imaging) the complex conductivity of proppant-filled fractures. Whenever the conductivity of the geological formation is measured at a non-zero frequency, there is a real part (referred to as conductivity) and an imaginary part (which shows up as a phase difference between the applied voltage or current and the measured voltage or current), which is directly related to IP or dielectric constant. To obtain meaningful results, suitable proppant additive materials are selected in accordance with embodiments of the present invention that have desired EM characteristics, favorable size, and favorable density.

Aspects of the present invention provide for:

1) Selection and design of an EM property of a proppant additive material, which may include a sub-terrestrial nano- or micron-sized particle/contrast agent with desired EM (IP/conductivity) and mechanical and density properties similar to those of standard oxide ceramic or sand proppants, whereby design may include changing the surface properties and/or particle shapes and/or sizes, i.e., the properties that affect the phase shift in IP;

2) A varying volume percentage of a proppant additive material mechanically mixed with a standard proppant-like material (e.g., sand);

3) Injection of a highly pressurized proppant-fluid loaded with the proppant and/or the proppant additive material and subsequent closing of unpropped fractures upon the removal of the external pressure; and/or 4) In-situ mapping of the spatial extension of the propped regions (regions of the geological formation subject to the hydraulic fracturing in which fractures are propped open by the proppants) via geophysical tools that are employed for the upstream exploration and exploration of oil and/or gas such as well logging and cross-well sensors.

Imaging of the injected fracture sizes, extent, and distribution may be obtained using one of several well-known techniques. Measurement of induced polarization ("IP") is a geophysical imaging technique used to identify subsurface materials. This technique is similar to electrical resistivity tomography ("ERT") or induced polarization tomography ("IPT") wherein a map of the subsurface complex resistivity is monitored through two (or several) electrodes. Time domain IP techniques may be used to measure the voltage decay or chargeability over a specified time interval after the applied voltage is removed. A frequency transformation provides the real and imaginary parts of the conductivity. Frequency domain IP techniques (also referred to as Spectral Induced Polarization) may be used, which employ alternating currents ("AC") to induce electric charges in the subsurface, and the apparent resistivity is measured at different AC frequencies.

Use of IP in aspects of the present disclosure is different from and an improvement over simple conductivity. IP effects can be measured using a smaller volume percentage of the novel proppant additive in the fracking fluid. In contrast, conductivity techniques require a higher volume percentage of the proppant additive in the fluid, since the particles must touch each other in order to provide a continuous electrical path, which is volume percentage exceeding the electrical percolation threshold, generally about 40-80% of the solid phase. Aspects of the present invention utilize a volume percentage of proppant additive less than 40% of the solid phase.

In the case of dielectric enhancement/induced polarization ("IP") techniques, special insulators/conductors (which are capable of having a significant real part of dielectric constant in presence of water) are brought in contact with water (primarily in the fracking fluid). EM techniques, either in the time or the frequency domain (as previously mentioned), can then be used for imaging the geological formation. Proppants that may be used include nano- and/or micron-sized particles, capsule-type sensors that can release the particles on demand, as well as microfabricated proppants. A mixture of the IP proppant and nanoparticles may be utilized, both having a dielectric response. Because they have different frequency dependencies, the propped fractures as well as the fluid-invaded "unpropped" portions of the formation into which nanoparticles can leak can be mapped, leading to a synergistic mapping technique.

Examples of Proppant Additives

Aspects of the present disclosure may utilize coke breeze particles as a proppant additive for operating as a dielectric enhancement contrast agent. Coke breeze particles are the undersized screenings (usually less than 10 mm) of coke. During coke production, the screening operation is where coke pieces and coke dust too small for steel making are removed. Coke breeze may then be either reused onsite (e.g., in the sinter plant) or sold offsite as a by-product.

As a result, coke breeze particles have approximately the same size as sand particles, have a similar density to sand, and have the mechanical strength to function as a proppant. Further, coke breeze particles are relatively inexpensive to obtain.

Exemplary coke breeze particles have a density of about 2 $g/cm^3$ to 2.5 $g/cm^3$ and can withstand a large static pressure of at least 2000 psi to 112,000 psi. Coke breeze particles are moderately electronically conductive when in granular form. Coke breeze particles between 0.05 mm and 1 mm exhibit a very large dielectric signature, which is readily observable utilizing phase measurement techniques. For example, at 100 Hz, a large phase is observed when coke breeze/sand mixtures are saturated with saline liquids, with resistivities ranging from about 60 $\Omega$m to 0.07 $\Omega$m.

There are several other graphitic, sand-like, or metallic proppant materials that have compatible size, density, and strength with respect to sand, and which have an induced polarization property useable within embodiments of the present invention. In addition to the sand-like density and strength, they should have proper surface activity to be endowed with a high zeta potential/surface activity. Such materials may be obtained by treating sand-like particles to induce surface activity. In accordance with embodiments of the present invention, these materials include, but are not limited to, the following:

1) Metal-coated sand grains, metal-coated alumina particles, or other metal oxide particles;

2) Functionalized sand-like particles (see FIG. 1); and

3) Porous silica grains.

Functionalization, which refers to surface modifications that can be carried out by chemisorption or physisorption, of particles performed in accordance with embodiments of the present invention result in changes in the chemical and physical characteristics of a particle's surface, which have an impact on IP. For example, such modifications may result in changes of the surface charges of the particles, which can lead to high zeta potential. For example, surface modification of silica nanoparticles may be used to reduce aggregation and nonspecific binding.

An example of functionalized silica particles is shown in FIG. 1, which illustrates functionalization of the surface of OH groups on silica to bind exchangeable cations. These particles can act as proppants (silica), or are proppants (sand), and can be functionalized to provide surface charges when immersed in water or an electrolyte.

Porous silica grains may have sand-like size and strength, but they also display high internal surface area. Modification of molecular functionality with porous silica can be introduced in a controlled way to adjust many key chemical or physical properties of the silica, including its hydrothermal stability, surface polarity, and the density of attached organic moieties.

In addition, the following materials may be used as proppant additive materials operating as contrast agents:

1. A combination of the aforementioned proppants with electrically conductive nanomaterials or fluids to synergistically enhance the proppant mixtures dielectric signal. These may include any of the classes of nanoparticles with dielectric properties, such as fibrous-like nanomaterials or fluids containing nanotubes, or capsules with electrically conductive and dielectrical properties (examples include: titania nanotubes, (e.g., see U.S. Published Patent Application No. 2015/0167459, which is hereby incorporated by reference herein) single and multiwall carbon nanotubes, etc.).

2. A capsule-like proppant that is inert in its injected state but releases electrical conductive particles with dielectric properties upon encountering a stimuli of choice to signal the location of a stimuli of interest.

3. A combination of a coke breeze proppant with inert degradable capsules, upon encountering a specific stimulus synergistically enhances the dielectric contrast.

Figure 2:
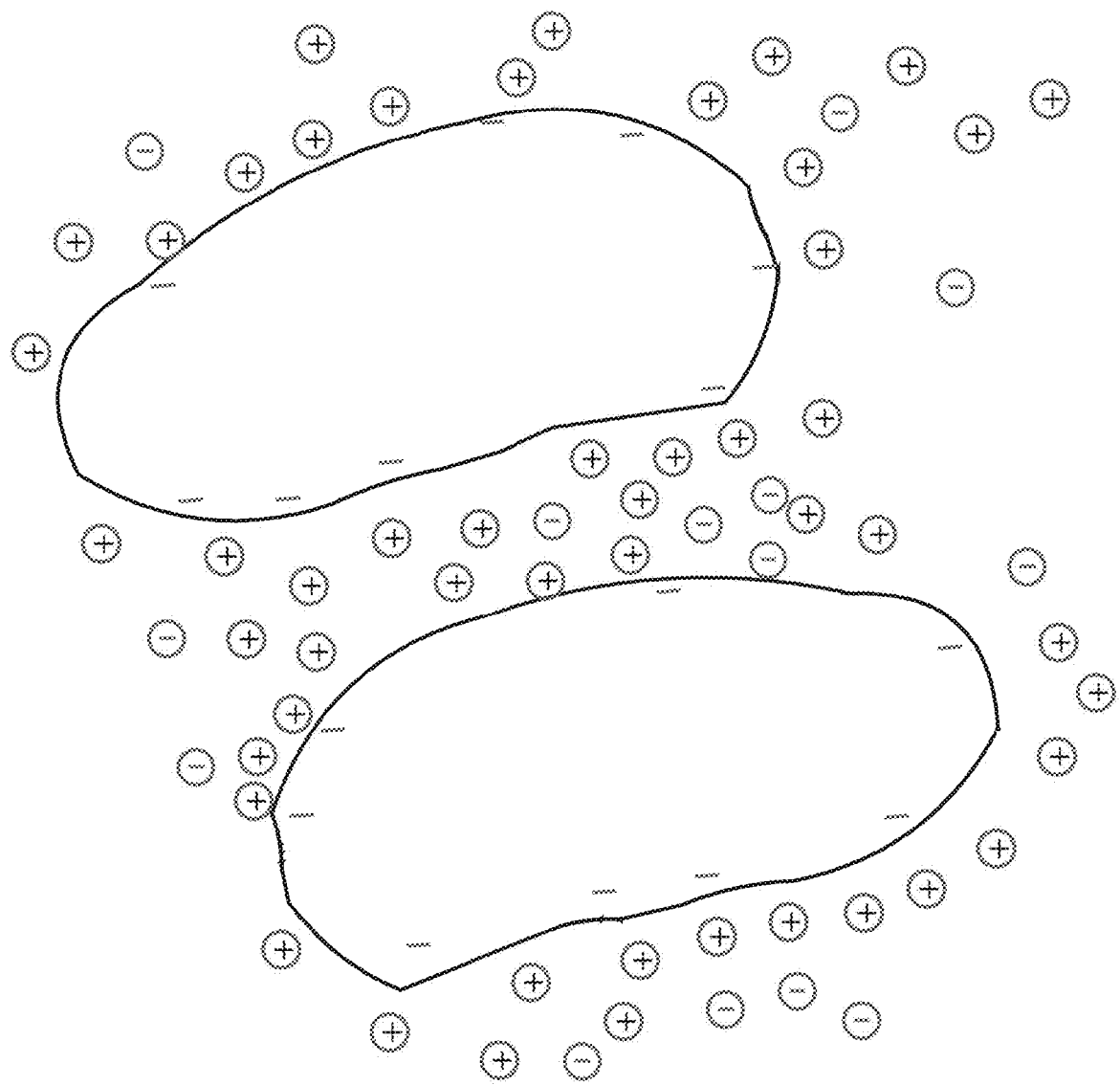
FIG. 2 illustrates a conceptual depiction of exemplary particles or grains that are insulating, which may obtain surface charges when immersed in water or an electrolyte.
Figure 3:
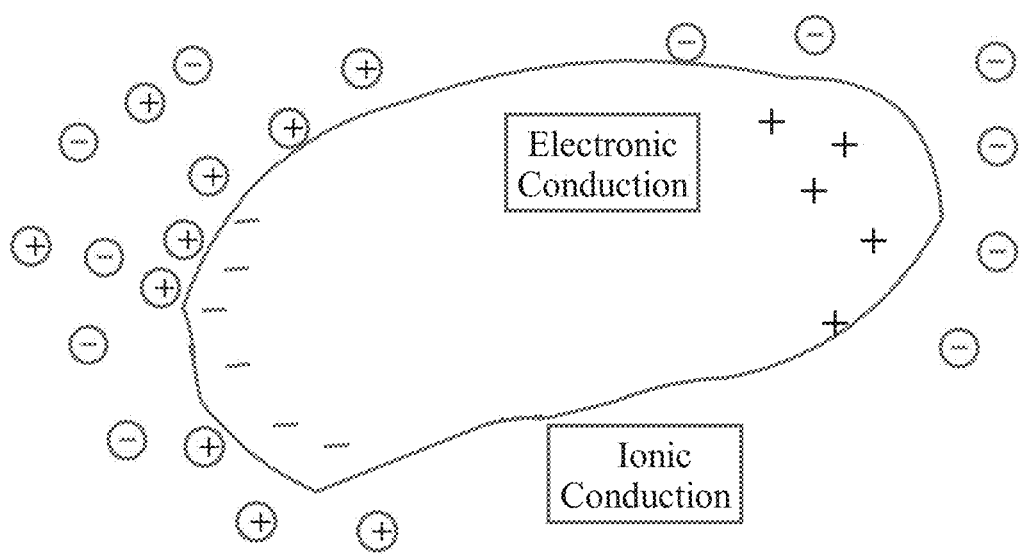
FIG. 3 illustrates a conceptual depiction of exemplary conductive grains or particles immersed in an electrolyte. The figure shows the charge distribution that is induced in the metallic particle and in the electrolyte under an applied electromagnetic field.

While not limiting aspects of the present invention to any particular mechanism, the manner in which aspects of the present invention may function is described herein. As shown in FIGS. 2 and 3, there are three molecular mechanisms that give rise to large dielectric constants to dielectric materials in the Hz-MHz range. In a first instance as conceptually illustrated in FIG. 2, polarization of a double layer of insulating grains or counter ions with fixed charges (e.g., clay) may occur. These surface charges (chosen to be illustrated as negative in FIG. 2) will attract counterions (chosen to be illustrated as positive in FIG. 2), and the two charges will form an electrical double layer around the particle. Within the double layer, the concentration of counterions greatly exceeds the concentration of ions in the electrolyte. The particles in FIG. 2 may include clay or $TiO_2$ double-layer polarization at the particle level.

Each enhancement mechanism is brought about by the rearrangement of charges, either by mobilization of counter ions (e.g., Na+ or Ca++) or due to geometrical charge redistribution (i.e., the Maxwell-Wagner effect) or surface reactions (Faradaic effects) in the presence of water. Even in the absence of the Faradaic effects, ideally polarized electrode processes give rise to dielectric enhancement in certain geometries. In the presence of an activating agent (like water or an ionic solution), each or all of the mechanisms may be utilized for the design of a dielectric switch in accordance with embodiments of the present invention.

Under an alternating electric field, the dielectric constant of a material can be expressed by complex permittivity or conductivity:

$$\varepsilon(\omega)=\varepsilon'(\omega)+i\varepsilon''(\omega)=\varepsilon'(\omega)+i\sigma(\omega)/(\varepsilon_0\omega)$$

where $\varepsilon(\omega)$ is the real permittivity, $\varepsilon''(\omega)$ is the imaginary permittivity, and $\sigma$ is the conductivity. Clay-like materials with electrochemical double layers can possess very large dielectric constants of $\varepsilon'(\omega) \approx 10^6$ in the presence of water. In comparison, water has a dielectric constant of about 80, and most oils fall below a dielectric constant of 2.

A double-layer mechanism can exist in a media that contains insulating grains or counter ions. For example, it can cause polarization in "shale-like" sands (a type of geological formation) at low frequencies. Clays have this double-layer effect. Clays (e.g., alumina-silicate layers) have immobile negative charges embedded due to lattice defects. These are balanced by positive cations outside the lattice. Dry clay has a dielectric constant of about 5. But these positive ions become mobile in the presence of water/electrolyte, and form a "double layer." This double layer is a region in the electrolyte/solid interface where the concentration of cations exceeds that of anions by a large amount. The double-layer polarization occurring in the presence of an external EM field causes high dielectric permittivity.

Positive counter ions lead to low polarization. The presence of water mobilizes the counter ions leading to enhanced dielectric contrast. The polarization of exchangeable Ca++ and Na+ ions outside the lattice in the presence of water gives rise to interfacial polarization. Note, the above case is for oxides and alumino-oxides that are insulating.

FIG. 3 illustrates a conceptual depiction of exemplary conductive grains or particles immersed in an electrolyte. The figure shows the charge distribution that is induced in the metallic particle and in the electrolyte under an applied electromagnetic field. FIG. 3 conceptually illustrates a second "Faradaic" mechanism, metallic induced polarization ("IP"), which is responsible for high dielectric permittivity when a polarization layer is generated by surface reactions on conducting grains, such as pyrite particles. The conductivity inside conducting grains is by electrons, while the conduction is by ions in the surrounding electrolyte (e.g., water-containing salts). In the presence of an external electromagnetic field, positive ions attract electrons in conduction, and negative ions repel electrons. Ion accumulation on the electrolyte side of the grain interface causes high dielectric permittivity. This type of polarization can occur in source shales (a type of geological formation), where pyrite is generally associated with organic material.

A third mechanism referred to as the Maxwell-Wagner effect is a geometrical effect that enhances the dielectric permittivity in the megahertz frequency range due to charge buildup at interfaces of grain surfaces with conductivity or permittivity contrasts. The discontinuity at the boundary gives a time-dependent surface charge in the presence of an electromagnetic field. Grains (particles) with a "plate-like" shape act as thin capacitors, creating very high permittivity.

Examples of Proppant Additive Materials and Properties

Embodiments of the present disclosure are further illustrated by the following examples, which are set forth to illustrate the presently disclosed subject matter and are not to be construed as limiting. The examples describe testing carried out to confirm the ability of embodiments of the present systems to deliver and release one or more materials under various conditions that exemplify various environments in which embodiments of the present systems may be utilized.

As disclosed herein, a colloidal suspension of both conductive particles and insulating particles that display a surface charge when immersed in an electrolyte can be configured to exhibit an extraordinary enhancement of its relative permittivity through the interaction of surface charge and mobile counterions that are attracted to those colloidal particles. FIGS. 2 and 3 illustrate conceptual schematics that show how surface charges and counterions interact.

In order to demonstrate the large increase in relative permittivity expected for colloidal suspensions, coke breeze particles and zero valent iron ("ZVI") were utilized as exemplary contrast agents for suspensions based on conductive and insulating particles, respectively.

Figure 4:
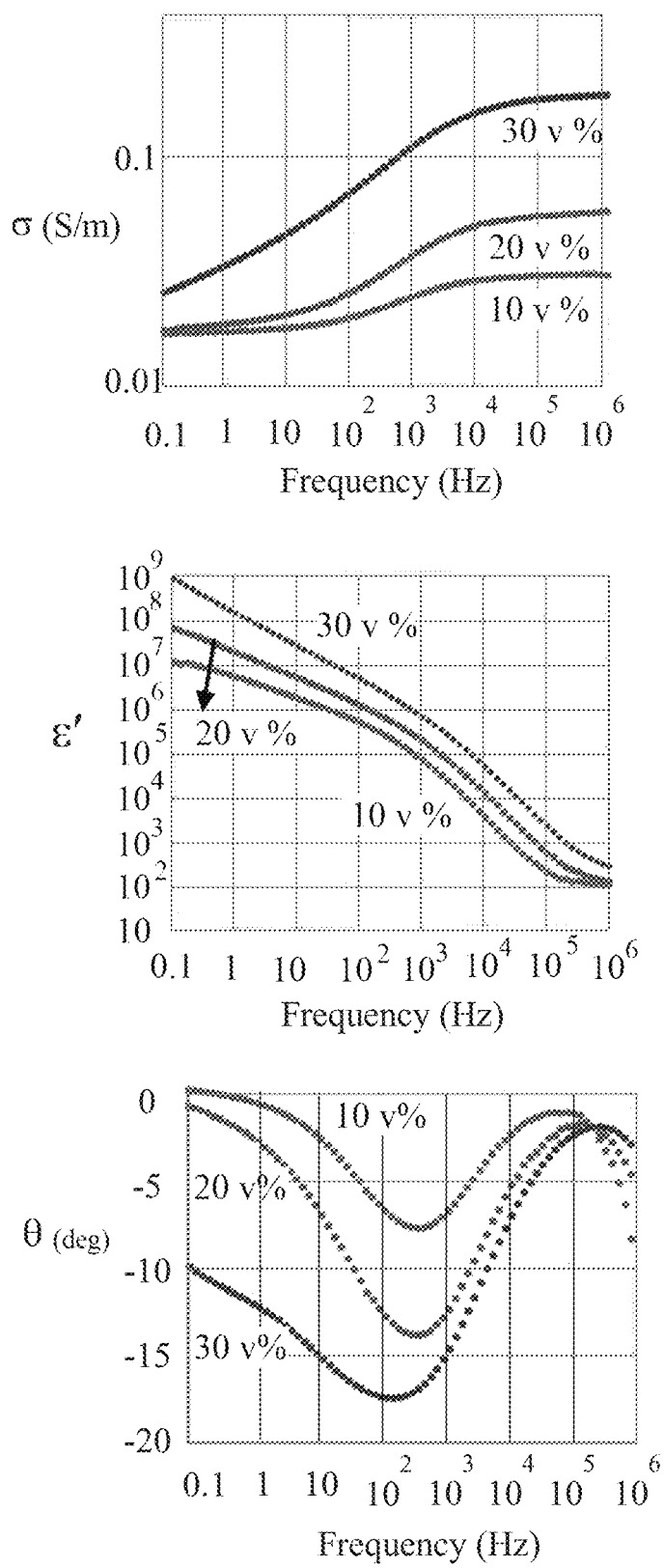
FIG. 4 shows three graphs representing measurements as a function of frequency of the conductive and dielectric properties of mixtures including coke breeze ("CB") particles mixed with sand particles. The top graph shows conductivities of the mixtures. The middle graph shows dielectric properties of the mixtures, i.e., relative permittivity of the mixtures. The bottom graph shows phase shift responses of the mixtures.
Figure 5:
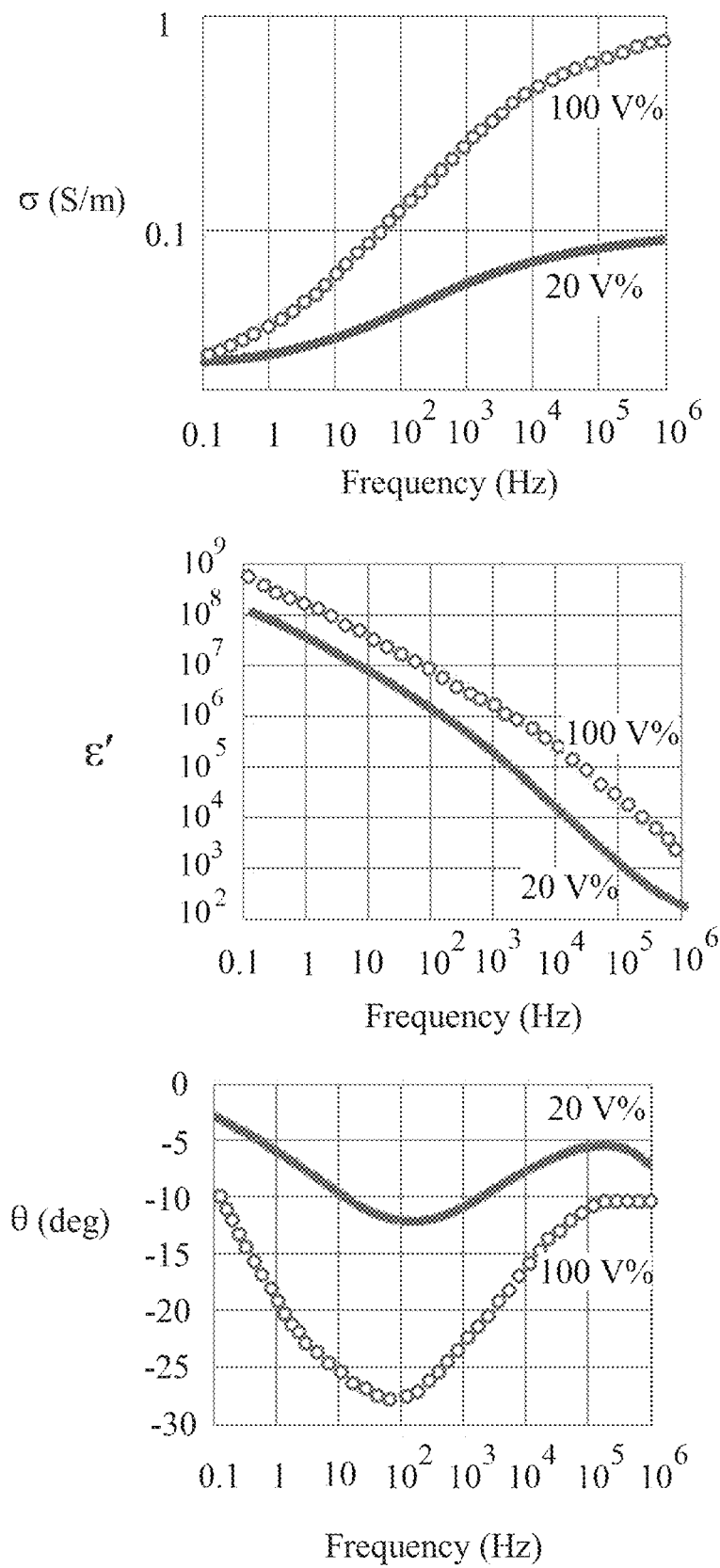
FIG. 5 shows three graphs representing measurements of the conductive, dielectric, and phase response of zero valent iron ("ZVI") particles mixed with sand and wetted with a 10 Ωm NaCl solution.

Measurements of mixtures (i.e., colloidal suspensions) containing dielectric contrast agents, sand, and electrolyte solution using a galvanic approach are presented in FIG. 4 for coke breeze and FIG. 5 for ZVI. The results are representative for colloidal suspensions where particle size and electrolyte concentration may be of similar values. Both parameters may be used to alter the frequency dependence of the observed effect to suit a desired detection (e.g., mapping or imaging) method. The measurements determined the complex impedance of the mixture, producing both the magnitude and phase of the impedance, or equivalently the real (R) and imaginary (X) part of the impedance. The phase $\theta$ here is defined by: $\tan(\theta)=X/R=\omega\varepsilon_0\varepsilon'/\sigma$ (see previously disclosed definition of $\varepsilon(\omega)$).

FIGS. 4 and 5 both display in three graphs (top, middle, bottom), the measured conductivity (top graphs), dielectric constant or relative permittivity (middle graphs), and phase response (bottom graphs) for mixtures containing coke breeze (see FIG. 4) and zero valent iron (see FIG. 5). The observed variation in frequency for conductivity, relative permittivity, and phase is a consequence of the enhanced dielectric properties caused by the interaction of mobile ions from the electrolyte solution with the contrast agent in the mixture. For both materials, the observed enhancement of the relative permittivity scaled in relation with the volume percentage of the contrast agent within the mixture. Conductivity, relative permittivity, and phase display the frequency dependent behavior expected for dielectric enhancement or induced polarization. The conductivities of the materials underwent a transition from a low frequency, low conductive state to a high frequency, high conductive state. This transition is mirrored in the phase response behaviors that experienced a maximum at the midpoint of the conductivity transition. The relative permittivity shows the enhancements that are expected for the mixtures.

The FIG. 4 measurements were performed at an applied pressure of 4.8 psi. Coke breeze particles were composed of conductive particles, such as depicted in FIG. 3. Dry mixtures of various volume percentages of coke breeze particles with sand surfaces were wetted with a 10 $\Omega$m NaCl solution. The ZVI particles had a metallic core but were covered in an oxide layer, rendering the particles insulating. As a result, the ZVI is an example of insulating particles immersed in an electrolyte (see FIG. 2). The sample comprising 100 v % ZVI showed qualitatively the same frequency response as a sample with 20 v %, albeit with a larger dielectric contrast.

Effective contrast agents require a very large relative permittivity and concomitant phase. As shown in the bottom graphs of FIGS. 4 and 5, the measured phase responses were large and easily observable. Equally important, the phase response was large from 1 Hz to 100 Hz, i.e., over a frequency range that is common to most currently used measurement techniques. Larger phase responses at higher frequencies can be achieved by varying the volume percentage (v %) of the contrast agents, the conductivity of the electrolyte, and/or the particle sizes of the contrast agents.

Results of the measurements show that the dielectric contrast enhances with increasing volume percentage of coke breeze (see the middle graphs). Based on measurements, the 30 v % sample produced the largest dielectric enhancement. If the concentration of coke breeze was increased beyond the electrical percolation threshold, the sample became conductive (not shown).

Since coke breeze is conductive, the volume percentage of coke breeze in the mixture can be kept below the electrical percolation threshold yet still maintain a large phase contrast (see phase equation above). The volume percentage of the coke breeze particles in the mixtures represented in FIG. 4 was maintained below 30 v %.

Endurance of Coke Breeze

The pressure on hydraulic fracturing proppants in the opened fractures can be enormous, as the natural tendency of an opened fracture is to close due to the overburden pressure. It has been discovered that the coke breeze particles remained undamaged and intact under a static pressure of 772 GPa ($N/m^2$=Pa) or 7720 bars or 111969 psi. A ½ inch die was used (area=$1.27\times10^{-4}$ $m^2$) to compress the coke breeze particles. An equivalent force of 10 metric tons was applied. Area=pi*$(0.25*0.0254)^2$=pi*$(6.35\times10^{-3})^2 m^2$=$1.27\times10^{-4}$ $m^2$. Therefore, the exerted pressure was 772 GPa ($N/m^2$=Pa). Typically, the overburden pressure in geological formations increases by about 23 kPa/m, or 1.0 psi/ft. This implies that the coke breeze particles are extremely strong and stable up to overburden pressures encountered up to 20 miles of depth below ground.

Detection Schemes Deployed In The Field

There are numerous techniques for detecting IP or the frequency dependent dielectric constant of proppant additive materials for imaging (mapping) fractures. Any instrument that can measure the amplitude and the phase of the electrical/electromagnetic signals, i.e., the complex signal, is suitable for such imagine techniques. The complex signal may be stated as complex conductivity (conductivity and IP) or as the real and the imaginary parts of the dielectric. But these two presentations are equivalent, and one may convert between the two by a simple multiplication factor that depends on the operating frequency of the instrument.

A technique for detection that may be utilized within embodiments of the present invention is the induction technique. This technique is used for several oil field logging tools, whereby this approach typically works at multiple frequencies ranging from the kilohertz range to 1 Gigahertz.

Another technique for detection that may be utilized within embodiments of the present invention is the galvanic technique, which is often used in environmental applications, but also occasionally used for oil field applications. The galvanic technique operates both in the frequency and the time domain.

As new techniques for measuring the complex IP signal emerge, they also can be used to detect IP of the proppant additive materials. Regardless of the particular technique used, the physical mechanism may essentially be the same (see FIGS. 6 and 7). Within the exemplary techniques for imaging and mapping fractures within a geological formation, the utilized contrast agents may be any of the materials disclosed herein, including the proppant additive particles, such as coke breeze particles and/or ZVI particles. Moreover, such proppant additive particles may function as proppants for keeping open the fractures, and thus may be utilized with convention proppant materials, or may be solely used instead of conventional proppant materials.

Figure 6:
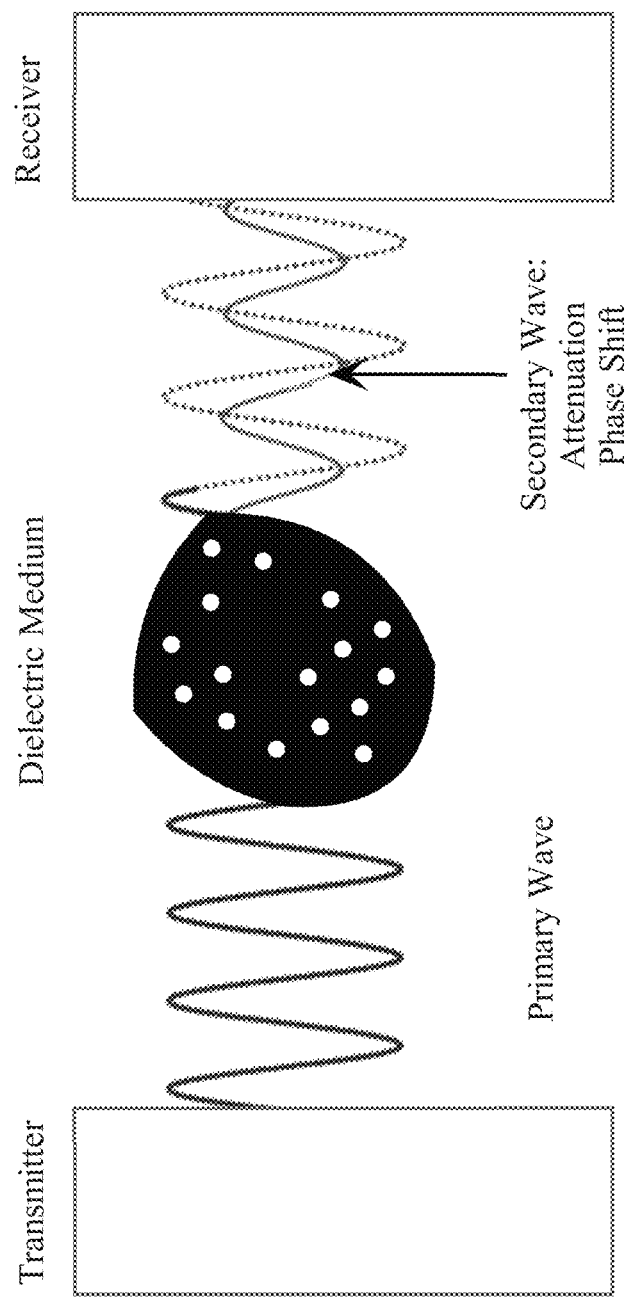
FIG. 6 illustrates an exemplary schematic for detecting dielectric contrast within a geological formation in accordance with embodiments of the present invention.

FIG. 6 illustrates an exemplary schematic for detecting dielectric contrast within a geological formation in accordance with embodiments of the present invention. Dielectric contrast agents (represented by the dots in the dielectric medium) are injected into the geological formation. A transmitter emits a primary wave(s) of electromagnetic energy that impinges on a region of the geological formation containing the contrast agents and induces a secondary wave(s) of electromagnetic energy with a distinct attenuation and phase shift. The two waves superimpose and are detected at the receiver where the wave amplitude (e.g., the real conductivity) and phase shift (e.g., the imaginary conductivity) with respect to the primary wave are recorded. An array of such receivers may be implemented to measure amplitude and phase information as a function of receiver location. This information may be used as the basis of an inversion routine that produces the location of the contrast agent.

Figure 7:
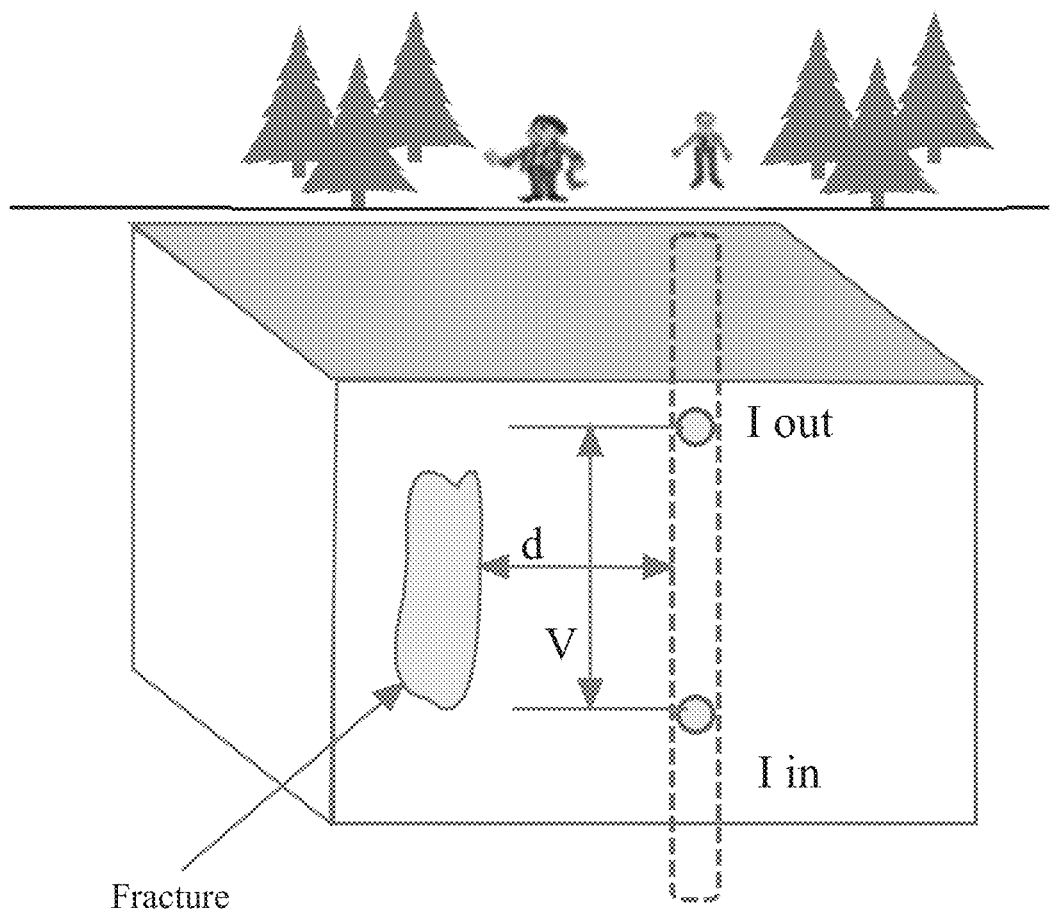
FIG. 7 conceptually illustrates a schematic for a galvanic measurement of a complex dielectric showing two current electrodes inserted in a vertical borehole—one is for injecting current and the other is for the drainage, in accordance with embodiments of the present invention.

FIG. 7 conceptually illustrates a schematic for a galvanic measurement of a complex dielectric showing two current electrodes inserted in a vertical borehole—one is for injecting current and the other is for the drainage, in accordance with embodiments of the present invention. Such a technique can be utilized in a similar manner as the technique in FIG. 6 for utilizing any of the materials disclosed herein as a contrast agent for imaging and mapping a geological formation, including fractures formed therein. Not shown are the array of voltage electrodes that are locked in for phase sensitivity. From the voltage amplitudes and phases, one can map the hydraulic fractures.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" and the use of the "/" character between two words when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

All publications and patent applications are herein incorporated by reference to the same extent as if each individual publication or patent application was specifically and individually indicated to be incorporated by reference. It is contemplated that any embodiment discussed in this specification can be implemented with respect to any method, kit, reagent, or composition of the invention, and vice versa. Furthermore, compositions of the invention can be used to achieve methods of the invention.

What is claimed is:

1. A method comprising:
performing a hydraulic fracturing of a geological formation by injection of a proppant mixture into the geological formation to form fractures in the geological formation, wherein the proppant mixture comprises a liquid, proppant, and proppant additive particles, wherein the hydraulic fracturing results in a presence of the proppant additive particles within the formed fractures, wherein the proppant additive particles are configured with a first complex conductivity that is measurably different than a second complex conductivity exhibited by materials comprising the geological formation, wherein the complex conductivity includes a real conductivity and an imaginary conductivity; and
imaging the fractures formed in the geological formation with electromagnetic energy at one or more frequencies in a manner so that the proppant additive particles function as a contrast agent due to the first complex conductivity of the proppant additive particles being measurably different from the second complex conductivity, wherein the imaginary conductivity is measured from a polarization induced in the proppant additive particles by the electromagnetic energy.

2. The method as recited in claim 1, wherein the imaging is produced from measured phase shift responses over a range of the one or more frequencies.

3. The method as recited in claim 1, wherein a volume percentage of the proppant additive particles is about 100% or less of the proppant mixture.

4. The method as recited in claim 1, wherein the proppant additive particles have sizes in substantially a range of sizes of the proppant.

5. A method comprising:
performing a hydraulic fracturing of a geological formation by injection of a proppant mixture into the geological formation to form fractures in the geological formation, wherein the proppant mixture comprises a liquid, proppant, and proppant additive particles, wherein the hydraulic fracturing results in a presence of the proppant additive particles within the formed fractures, wherein the proppant additive particles are configured with a first complex conductivity that is measurably different than a second complex conductivity exhibited by materials comprising the geological formation, wherein the complex conductivity includes a real conductivity and an imaginary conductivity; and
imaging the fractures formed in the geological formation with electromagnetic energy at one or more frequencies in a manner so that the proppant additive particles function as a contrast agent due to the first complex conductivity of the proppant additive particles being measurably different from the second complex conductivity, wherein a volume percentage of the proppant additive particles in the proppant mixture injected within the formed fractures is less than the electrical percolation threshold for distinguishing the real conductivity of the first complex conductivity from the real conductivity of the second complex conductivity.

6. A method comprising:
performing a hydraulic fracturing of a geological formation by injection of a proppant mixture into the geological formation to form fractures in the geological formation, wherein the proppant mixture comprises a liquid, proppant, and proppant additive particles, wherein the hydraulic fracturing results in a presence of the proppant additive particles within the formed fractures, wherein the proppant additive particles are configured with a first complex conductivity that is measurably different than a second complex conductivity exhibited by materials comprising the geological formation; and
imaging the fractures formed in the geological formation with electromagnetic energy at one or more frequencies in a manner so that the proppant additive particles function as a contrast agent due to the first complex conductivity of the proppant additive particles being measurably different from the second complex conductivity, wherein the proppant additive particles comprise coke breeze particles.

7. The method as recited in claim 6, wherein the proppant mixture further comprises nanoparticles having an electromechanical frequency response different than that of the proppant additive particles, and wherein the nanoparticles are configured to penetrate into the geological formation surrounding the formed fractures.

8. The method as recited in claim 6, wherein the proppant mixture further comprises nanoparticles having an electromechanical frequency response different than that of the proppant additive particles, and wherein the imaging the fractures formed in the geological formation is performed with at least two different frequencies so that images produced from the electromechanical frequency response of the nanoparticles are different than images produced from the electromechanical frequency response of the proppant additive particles.

9. A method comprising:
performing a hydraulic fracturing of a geological formation by injection of a proppant mixture into the geological formation to form fractures in the geological formation, wherein the proppant mixture comprises a liquid, proppant, and proppant additive particles, wherein the hydraulic fracturing results in a presence of the proppant additive particles within the formed fractures, wherein the proppant additive particles are configured with a first complex conductivity that is measurably different than a second complex conductivity exhibited by materials comprising the geological formation; and
imaging the fractures formed in the geological formation with electromagnetic energy at one or more frequencies in a manner so that the proppant additive particles function as a contrast agent due to the first complex conductivity of the proppant additive particles being measurably different from the second complex conductivity, wherein the proppant additive particles comprise zero valent iron particles.

10. A system comprising:
hydraulic fracturing equipment configured to inject a proppant mixture into a geological formation to form fractures in the geological formation and result in a presence of the proppant additive particles within one or more of the formed fractures, wherein the proppant mixture comprises a liquid, proppant, and proppant additive particles, wherein the proppant additive particles are configured with a first complex conductivity that is measurably different than a second complex conductivity exhibited by materials comprising the geological formation; and
imaging equipment configured to produce images of the fractures formed in the geological formation with electromagnetic energy at one or more frequencies in a manner so that the proppant additive particles present within one or more of the formed fractures function as a contrast agent due to the first complex conductivity of the proppant additive particles being measurably different from the second complex conductivity, wherein the proppant mixture further comprises nanoparticles having an electromechanical frequency response different than that of the proppant additive particles, and wherein the nanoparticles are configured to penetrate into the geological formation surrounding the formed fractures.

11. The system as recited in claim 10, wherein the complex conductivity includes a real conductivity and an imaginary conductivity.

12. A system comprising:
hydraulic fracturing equipment configured to inject a proppant mixture into a geological formation to form fractures in the geological formation and result in a presence of the proppant additive particles within one or more of the formed fractures, wherein the proppant mixture comprises a liquid, proppant, and proppant additive particles, wherein the proppant additive particles are configured with a first complex conductivity that is measurably different than a second complex conductivity exhibited by materials comprising the geological formation, wherein the complex conductivity includes a real conductivity and an imaginary conductivity; and
imaging equipment configured to produce images of the fractures formed in the geological formation with electromagnetic energy at one or more frequencies in a manner so that the proppant additive particles present within one or more of the formed fractures function as a contrast agent due to the first complex conductivity of the proppant additive particles being measurably different from the second complex conductivity, wherein the imaginary conductivity is measured from a polarization induced in the proppant additive particles by the electromagnetic energy.

13. The system as recited in claim 12, wherein the imaging is produced from measured phase shift responses over a range of the one or more frequencies.

14. A system comprising:
hydraulic fracturing equipment configured to inject a proppant mixture into a geological formation to form fractures in the geological formation and result in a presence of the proppant additive particles within one or more of the formed fractures, wherein the proppant mixture comprises a liquid, proppant, and proppant additive particles, wherein the proppant additive particles are configured with a first complex conductivity that is measurably different than a second complex conductivity exhibited by materials comprising the geological formation, wherein the complex conductivity includes a real conductivity and an imaginary conductivity; and
imaging equipment configured to produce images of the fractures formed in the geological formation with electromagnetic energy at one or more frequencies in a manner so that the proppant additive particles present within one or more of the formed fractures function as a contrast agent due to the first complex conductivity of the proppant additive particles being measurably different from the second complex conductivity, wherein a volume percentage of the proppant additive particles in the proppant mixture injected within the formed fractures is less than the electrical percolation threshold for distinguishing the real conductivity of the first complex conductivity from the real conductivity of the second complex conductivity.

15. A system comprising:
hydraulic fracturing equipment configured to inject a proppant mixture into a geological formation to form fractures in the geological formation and result in a presence of the proppant additive particles within one or more of the formed fractures, wherein the proppant mixture comprises a liquid, proppant, and proppant additive particles, wherein the proppant additive particles are configured with a first complex conductivity that is measurably different than a second complex conductivity exhibited by materials comprising the geological formation; and imaging equipment configured to produce images of the fractures formed in the geological formation with electromagnetic energy at one or more frequencies in a manner so that the proppant additive particles present within one or more of the formed fractures function as a contrast agent due to the first complex conductivity of the proppant additive particles being measurably different from the second complex conductivity, wherein the proppant additive particles comprise coke breeze particles.

16. The system as recited in claim 15, wherein the proppant and the coke breeze particles are configured to hold open the fractures subsequent to their formation.

17. A system comprising:

hydraulic fracturing equipment configured to inject a proppant mixture into a geological formation to form fractures in the geological formation and result in a presence of the proppant additive particles within one or more of the formed fractures, wherein the proppant mixture comprises a liquid, proppant, and proppant additive particles, wherein the proppant additive particles are configured with a first complex conductivity that is measurably different than a second complex conductivity exhibited by materials comprising the geological formation; and imaging equipment configured to produce images of the fractures formed in the geological formation with electromagnetic energy at one or more frequencies in a manner so that the proppant additive particles present within one or more of the formed fractures function as a contrast agent due to the first complex conductivity of the proppant additive particles being measurably different from the second complex conductivity, wherein the proppant additive particles comprise insulating particles with a functionalized surface that acquires a high surface charge when exposed to water or an electrolyte.

* * * * *